(12) United States Patent
Yu et al.

(10) Patent No.: US 11,511,773 B2
(45) Date of Patent: Nov. 29, 2022

(54) GUIDANCE APPARATUS FOR AUTONOMOUS VEHICLE AND METHOD THEREFOR

(71) Applicants: HYUNDAI MOTOR COMPANY, Seoul (KR); KIA MOTORS CORPORATION, Seoul (KR)

(72) Inventors: Min Sang Yu, Hwaseong-si (KR); Dong Il Yang, Seoul (KR); Jin Su Jeong, Suwon-si (KR); Eun Young Choi, Seoul (KR); Ki Seok Seong, Cheonan-si (KR); Hyeong Jin Ham, Seongnam-si (KR); Rosali Sun Pyun, Seongnam-si (KR); Pil Cheon Jang, Seongnam-si (KR); Woo Jin Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 175 days.

(21) Appl. No.: 17/010,407

(22) Filed: Sep. 2, 2020

(65) Prior Publication Data
US 2021/0221400 A1    Jul. 22, 2021

(30) Foreign Application Priority Data
Jan. 16, 2020   (KR) .................. 10-2020-0006018

(51) Int. Cl.
*B60W 60/00*   (2020.01)
*B60W 50/14*   (2020.01)
(Continued)

(52) U.S. Cl.
CPC ......... *B60W 60/0016* (2020.02); *B60Q 3/217* (2017.02); *B60W 30/0956* (2013.01);
(Continued)

(58) Field of Classification Search
CPC ......... B60W 60/0015; B60W 30/0956; B60W 40/08; B60W 50/14; B60W 2540/01;
(Continued)

(56) References Cited

U.S. PATENT DOCUMENTS 11,072,347 B2 * 7/2021 Cho ................... B60W 60/0015
2002/0195290 A1 * 12/2002 Hayakawa ............. B60K 28/14
                                                                180/277

(Continued)

OTHER PUBLICATIONS

Ryu et al., The Analysis of the Risk of Vehicle Fires in Korea and the Effectiveness of Initial Fire Extinguishing, Mar. 2019 (Year: 2019).*

(Continued)

*Primary Examiner* — Dale W Hilgendorf
*Assistant Examiner* — Hana Lee
(74) *Attorney, Agent, or Firm* — Morgan, Lewis & Bockius LLP

(57) ABSTRACT

A guidance apparatus for an autonomous vehicle and a method therefor are provided. The guidance apparatus includes a first guidance device that guides a passenger in the autonomous vehicle through first response information, a second guidance device that guides a rescuer outside the autonomous vehicle through second response information, and a controller that controls guidance on the first response information and guidance on the second response information, when abnormality occurs in the autonomous vehicle.

17 Claims, 9 Drawing Sheets

(51) Int. Cl.
*B60Q 3/217* (2017.01)
*B60W 30/095* (2012.01)
*B60W 40/08* (2012.01)
*E05B 77/02* (2014.01)
*E05F 15/72* (2015.01)
*B60W 30/08* (2012.01)

(52) U.S. Cl.
CPC ............ *B60W 40/08* (2013.01); *B60W 50/14* (2013.01); *B60W 60/0015* (2020.02); *E05B 77/02* (2013.01); *E05F 15/72* (2015.01); *B60W 2030/082* (2013.01); *B60W 2040/0818* (2013.01); *B60W 2540/01* (2020.02); *E05Y 2900/531* (2013.01)

(58) Field of Classification Search
CPC .... B60W 2030/082; B60W 2040/0818; B60Q 3/217; E05B 77/02; E05Y 2900/531
See application file for complete search history.

(56) References Cited

U.S. PATENT DOCUMENTS

| | | | |
|---|---|---|---|
| 2009/0027188 A1* | 1/2009 | Saban | B60N 2/002 340/439 |
| 2014/0085337 A1* | 3/2014 | Velten | G06F 3/0412 345/635 |
| 2015/0307048 A1* | 10/2015 | Santora | B60R 21/013 348/148 |
| 2019/0232818 A1* | 8/2019 | Gangu | B60N 2/002 |
| 2021/0188322 A1* | 6/2021 | Yoshida | B60W 60/0016 |

OTHER PUBLICATIONS

Reis Thebault, US Doctor Died in Burning Tesla as Futuristic Doors Didn't Open After Crash, Alleges Lawsuit, Oct. 24, 2019, The Washington Post (Year: 2019).*

* cited by examiner

GUIDANCE APPARATUS FOR AUTONOMOUS VEHICLE AND METHOD THEREFOR

CROSS-REFERENCE TO RELATED APPLICATION

This application claims the benefit of priority to Korean Patent Application No. 10-2020-0006018, filed in the Korean Intellectual Property Office on Jan. 16, 2020, the entire contents of which are incorporated herein by reference.

TECHNICAL FIELD

The present disclosure relates to guiding a passenger or a rescuer through response information when abnormality occurs in an autonomous vehicle.

BACKGROUND

In general, an autonomous vehicle controls various systems in a vehicle including a steering device to recognize road environments for itself to determine driving situations and move to a target location along a planned driving path from its current location.

Such an autonomous vehicle may include an autonomous Emergency Braking (AEB), a Forward Collision Warning system (FCW), an Adaptive Cruise Control (ACC), a Lane Departure Warning System (LDWS), a Lane Keeping Assist System (LKAS), a Blind Spot Detection (BSD), a Rear-End Collision Warning System (RCW), a Smart Parking Assist System (SPAS), or the like.

Because it is possible for the autonomous vehicle to minimize intervention of a driver or to drive without intervention of the driver, the driver may be careless to recognize a structure of the autonomous vehicle or a location of equipment (e.g., a fire extinguisher) loaded into the autonomous vehicle.

For example, in a situation where the driver loses his or her consciousness after an accident occurs in the autonomous vehicle, and a rescuer, such as a firefighter, a police office, or the like, may not know how to open a door of the autonomous vehicle, it would be difficult to save the driver in a timely manner.

Thus, there is a need for a technology for guiding a passenger and a rescuer through a variety of response information when an accident occurs in the autonomous vehicle.

SUMMARY

The present disclosure has been made to solve the above-mentioned problems occurring in the prior art while advantages achieved by the prior art are maintained intact.

An aspect of the present disclosure provides a guidance device for an autonomous vehicle for helping a passenger to quickly escape from the autonomous vehicle or helping a rescuer to quickly extricate a passenger from the autonomous vehicle by guiding the passenger and the rescuer through response information for the passenger and response information for the rescuer in various manners when abnormality occurs in the autonomous vehicle and a method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a guidance apparatus for an autonomous vehicle may include a first guidance device that guides a passenger in the autonomous vehicle through first response information, a second guidance device that guides a rescuer outside the autonomous vehicle through second response information, and a controller that controls guidance on the first response information and guidance on the second response information, when abnormality occurs in the autonomous vehicle.

The first guidance device may include at least one of a fire extinguisher lamp, a voice output device, or an image output device.

The controller may control at least one of voice guidance on a location of a fire extinguisher in the autonomous vehicle, image guidance on the location of the fire extinguisher in the autonomous vehicle, or flashing of the fire extinguisher lamp.

The first guidance device may include at least one of a plurality of door lamps, a voice output device, or an image output device.

The controller may guide the passenger of the autonomous vehicle through a door causing the passenger of the autonomous vehicle to alight without collision with a surrounding vehicle.

The controller may control at least one of voice guidance on the door, image guidance on the door, or flashing of a lamp corresponding to the door.

The controller may notify the surrounding vehicle that it is able to open the door.

The controller may open the door, when the door is not opened within a reference time after guiding the passenger of the autonomous vehicle through the door.

The second guidance device may include at least one of a voice output device or an image output device.

The controller may control at least one of voice guidance on a method for popping out a hidden door handle of the autonomous vehicle by force or image guidance on the method for popping out the hidden door handle of the autonomous vehicle by force.

The controller may control at least one of voice guidance on the method for popping out the hidden door handle of the autonomous vehicle by force or image guidance on the method for popping out the hidden door handle of the autonomous vehicle by force, when an amount of impact applied to the autonomous vehicle is greater than a reference value.

The controller may control at least one of voice guidance on precautions when a battery in the autonomous vehicle is disconnected or image guidance on the precautions when the battery in the autonomous vehicle is disconnected.

The controller may control at least one of the voice guidance on the precautions when a battery in the autonomous vehicle is disconnected or the image guidance on the precautions when the battery in the autonomous vehicle is disconnected, when an amount of impact applied to the autonomous vehicle is greater than a reference value.

The controller may control at least one of voice guidance on personal information of the passenger in the autonomous vehicle or image guidance on the personal information of the passenger in the autonomous vehicle.

The controller may control at least one of the voice guidance on the personal information of the passenger in the autonomous vehicle or the image guidance on the personal information of the passenger in the autonomous vehicle, when an amount of impact applied to the autonomous vehicle is greater than a reference value.

The controller may control at least one of the voice guidance on the personal information of the passenger in the autonomous vehicle or the image guidance on the personal information of the passenger in the autonomous vehicle, when there is no motion of the passenger in the autonomous vehicle.

The controller may control at least one of the voice guidance on the personal information of the passenger in the autonomous vehicle or the image guidance on the personal information of the passenger in the autonomous vehicle, when the passenger in the autonomous vehicle is agreed beforehand.

The controller may control at least one of voice guidance on a location of a child in the autonomous vehicle or image guidance on the location of the child in the autonomous vehicle.

The controller may generate a control signal for unlocking a door corresponding to the location of the child in the autonomous vehicle.

The controller may determine at least one of a collision, a rear-end collision, drop, overturn, fire, or a non-linear movement pattern of the autonomous vehicle.

According to another aspect of the present disclosure, a guidance apparatus for an autonomous vehicle may include a first guidance device that guides a passenger in the autonomous vehicle through first response information, a second guidance device that guides a rescuer outside the autonomous vehicle through second response information, and a controller that controls guidance on the first response information or guidance on the second response information, with regard to a state of the passenger in the autonomous vehicle, when abnormality occurs in the autonomous vehicle.

The controller may control guidance on the first response information, when the passenger in the autonomous vehicle is conscious.

The controller may control guidance on the second response information, when the passenger in the autonomous vehicle is not conscious.

According to another aspect of the present disclosure, a guidance method for an autonomous vehicle may include detecting whether a passenger in the autonomous vehicle is conscious, when abnormality occurs in the autonomous vehicle, guiding a rescuer through rescuer response information, when the passenger is not conscious, guiding the passenger through passenger response information, when the passenger is conscious, and guiding the passenger and the rescuer through the passenger response information and the rescuer response information, when the passenger is conscious, but when there is no motion of the passenger.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
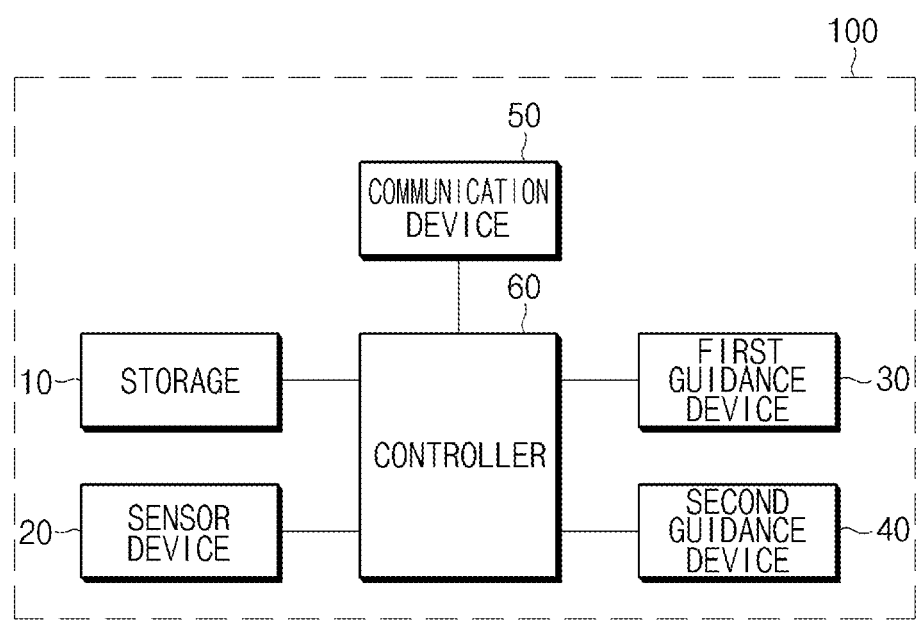
FIG. 1 is a block diagram illustrating a configuration of a guidance apparatus for an autonomous vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a guidance apparatus for an autonomous vehicle according to an embodiment of the present disclosure.

As shown in FIG. 1, a guidance apparatus 100 for an autonomous vehicle according to an embodiment of the present disclosure may include a storage 10, a sensor device 20, a first guidance device 30, a second guidance device 40, a communication device 50, and a controller 60. In this case, the respective components may be combined into one component and some components may be omitted, depending on a manner which executes the guidance apparatus 100 for the autonomous vehicle according to an embodiment of the present disclosure.

The storage 10 may store various logics, algorithms, and programs required in a process of guiding a passenger and a rescuer through response information for the passenger (hereinafter referred to as "passenger response information or first response information") and response information for the rescuer (hereinafter referred to as "rescuer response information" or "second response information") in various manners when abnormality occurs in the autonomous vehicle. Herein, the abnormality which occurs in the autonomous vehicle is used as the concept of including a collision, a rear-end collision, drop, overturn, fire, a non-linear movement pattern, or the like, and the response information is used as the concept of including a response guideline, a coping way, or the like.

The storage 10 may store information, notifying a passenger of a location of a fire extinguisher in an autonomous vehicle, as passenger response information. For example, the storage 10 may store the voice notice "The fire extinguisher is mounted under the middle seat of the vehicle." to guide a passenger through passenger response information by means of a voice output device 33 of FIG. 3. The storage 10 may store an image indicating a location of the fire extinguisher in the vehicle to guide a passenger through passenger response information by means of an image output device 34 of FIG. 3. The storage 10 may store control information about a fire extinguisher lamp 31 of FIG. 3 to guide a passenger through a location of the fire extinguisher through flashing of the fire extinguisher lamp 31.

The storage 10 may store data, guiding a passenger of the autonomous vehicle through a door causing the passenger of the autonomous vehicle to alight from the autonomous vehicle without collision with a surrounding vehicle, as passenger response information. In this case, the door causing the passenger of the autonomous vehicle to alight from the autonomous vehicle without collision with the surrounding vehicle may be selected by the controller 60. For example, the storage 10 may store the voice notice "You can get off safely through the right door." "You can get off safely through the left door." or "You can get off safely through the front door." to guide a passenger through passenger response information by means of the voice output device 33. The storage 10 may store an image indicating a door (the left door, the right door, or the front door) causing a passenger of the autonomous vehicle to alight from the autonomous vehicle without collision with a surrounding vehicle to guide a passenger through passenger response information by means of the image output device 34. The storage 10 may store control information of each door lamp 32 to guide a passenger through a safe door through flashing of the door lamp 32.

The storage 10 may store a message warning a surrounding vehicle that a door of the autonomous vehicle is able to be opened. For example, the storage 10 may store the message "Because the accident occurs in the autonomous vehicle that is stopped nearby, a passenger is expected to get off through the right/left/front door. Be careful driving."

The storage 10 may store a variety of information, necessary to safely extricate a passenger in the autonomous vehicle, as rescuer response information.

Figure 5:
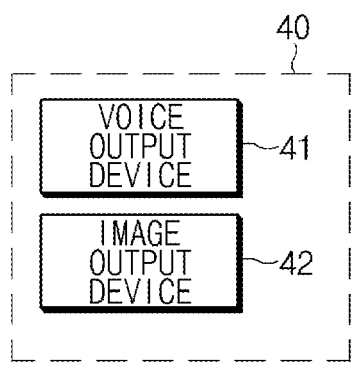
FIG. 5 is a block diagram illustrating a detailed configuration of a second guidance device of a guidance apparatus for an autonomous vehicle according to an embodiment of the present disclosure.

For example, the storage 10 may store the voice notice "Press the front part of the handle to pop out the handle." in a manner to pop out the hidden door handle of the autonomous vehicle by force to guide a rescuer through rescuer response information by means of a voice output device 41 of FIG. 5. The storage 10 may store an image for popping out the hidden door handle of an autonomous vehicle to guide a rescuer through rescuer response information by means of an image output device 42 of FIG. 5. For reference, the hidden door handle, which is the well-known technology, is usually fitted into the inside of a door and is popped out when a user who has his or her smart key is close to the hidden door handle.

For another example, the storage 10 may store the voice notice "Note that the orange line among battery connection lines is a high voltage line." as precautions when a rescuer disconnects a battery in the autonomous vehicle to guide the rescuer through rescuer response information by means of the voice output device 41. The storage 10 may store an image for notifying a rescuer that the orange line among battery connection lines is a high voltage line to guide the rescuer through rescuer response information by means of the image output device 42.

For another example, the storage 10 may store a voice notice indicating "a gender, an age, a blood type, a health status (pathological record), or the like" as personal information of the passenger to guide a rescuer through rescuer response information by means of the voice output device 41. The storage 10 may store an image indicating a gender, an age, a photo, a blood type, a health status, or the like of a passenger to guide the rescuer through rescuer response information by means of the image output device 42.

For another example, the storage 10 may store the voice notice "A child (infant) is riding on the left/right side of the back seat." as information helping to determine a person who should first be rescued among passengers to guide a rescuer through rescuer response information by means of the voice output device 41. The storage 10 may store an image indicating that an infant is riding on the left/right side of the back seat to guide a rescuer through rescuer response information by means of the image output device 42.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The sensor device 20 may be a set of sensors provided in the autonomous vehicle. In general, because it is difficult to show all sensors provided in the autonomous vehicle, for example, only certain sensors are shown as shown in FIG. 2.

Figure 2:
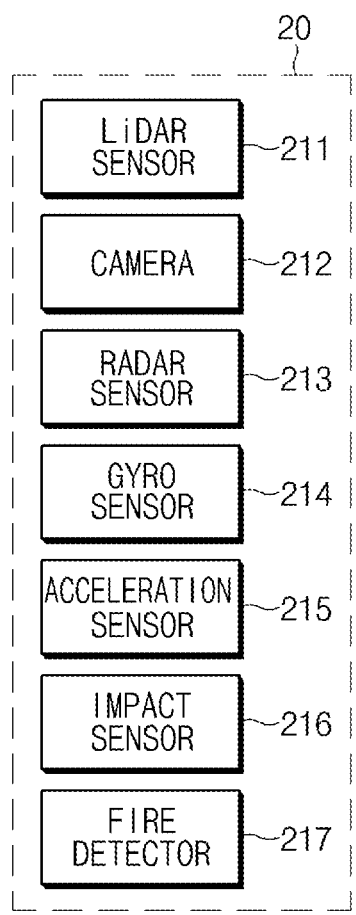
FIG. 2 is a block diagram illustrating a detailed configuration of a sensor device of a guidance apparatus for an autonomous vehicle according to an embodiment of the present disclosure.

FIG. 2 is a block diagram illustrating a detailed configuration of a sensor device of a guidance apparatus for an autonomous vehicle according to an embodiment of the present disclosure.

As shown in FIG. 2, a sensor device 20 provided in a guidance apparatus for an autonomous vehicle according to an embodiment of the present disclosure may include a Light Detection And Ranging (LiDAR) sensor 211, a camera 212, a Radio Detecting And Ranging (RaDAR) sensor 213, a gyro sensor 214, an acceleration sensor 215, an impact sensor 216, and a fire detector 217.

The LiDAR sensor 211 may be a type of environment sensor. When the LiDAR sensor 211 is loaded into an autonomous vehicle to rotate and emit a laser pulse in all directions, it may measure location coordinates or the like of a reflector based on a time when the laser pulse is reflected and returned.

The camera 212 may be a module for capturing an image around the autonomous vehicle, which may include a camera mounted on the front of the autonomous vehicle, a camera mounted on the rear of the autonomous vehicle, a camera mounted on the left of the autonomous vehicle, and a camera mounted on the right of the autonomous vehicle.

In this case, the camera 212 may further include an indoor camera for capturing the interior of the autonomous vehicle.

The RaDAR sensor 213 may emit an electromagnetic wave and may receive the electromagnetic wave reflected from an object to measure a distance from the object, a direction of the object, or the like. Such radar sensor 213 may be mounted on a front bumper and a rear side of the autonomous vehicle, may recognize an object in a long distance, and may be hardly affected by weather.

The gyro sensor 214 may be a sensor which uses properties of always maintaining the initially set direction irrespective of the rotation of the earth, which may measure a change in bearing of the autonomous vehicle.

The acceleration sensor 215 may measure acceleration of the autonomous vehicle. Such an acceleration sensor 215 may include a 3-axis acceleration sensor.

The impact sensor 216 may sense the amount of impact applied to the autonomous vehicle. Such an impact sensor 216 may include a vibration sensor.

The fire detector 217 may detects fire in the autonomous vehicle. Such a fire detector 217 may include a thermographic camera, a flame sensor, or the like.

Figure 3:
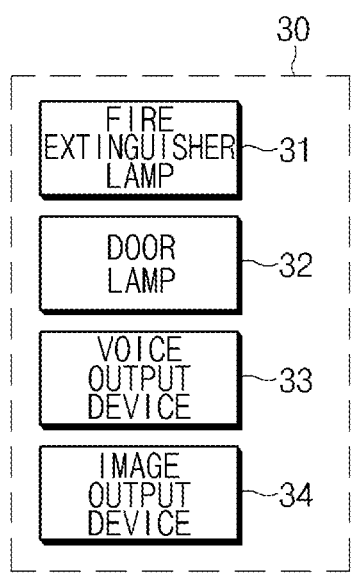
FIG. 3 is a block diagram illustrating a detailed configuration of a first guidance device of a guidance apparatus for an autonomous vehicle according to an embodiment of the present disclosure.

Next, a first guidance device 30 may be a module for guiding a passenger in the autonomous vehicle through passenger response information, which, as shown in FIG. 3, may include a fire extinguisher lamp 31, a plurality of door lamps 32, a voice output device 33, and an image output device 34.

FIG. 3 is a block diagram illustrating a detailed configuration of a first guidance device of a guidance apparatus for an autonomous vehicle according to an embodiment of the present disclosure.

A fire extinguisher lamp 31 may guide a passenger through a location of a fire extinguisher in the autonomous vehicle by turning on and off.

A door lamp 32 may include a front door lamp, a left door lamp, and a right door lamp and may guide a passenger through a door causing the passenger to alight from the autonomous vehicle without collision with a surrounding vehicle through flashing.

A voice output device 33 may output a voice notice for notifying a passenger of a location of a fire extinguisher in the autonomous vehicle, that is, "The fire extinguisher is mounted under the middle seat of the vehicle." to the inside of the autonomous vehicle.

The voice output device 33 may output a voice for guiding a passenger of the autonomous vehicle through a door causing the passenger of the autonomous vehicle to alight from the autonomous vehicle without collision with a surrounding vehicle, that is, "You can get off safely through the right door.", "You can get off safely through the left door.", or "You can get off safely through the front door." to the inside of the autonomous vehicle.

An image output device 34 may output an image indicating a location of a fire extinguisher in the autonomous vehicle to the inside of the autonomous vehicle.

The image output device 34 may output an image for guiding a passenger of the autonomous vehicle through a door causing the passenger of the autonomous vehicle to alight from the autonomous vehicle without collision with a surrounding vehicle to the inside of the autonomous vehicle.

Figure 4:
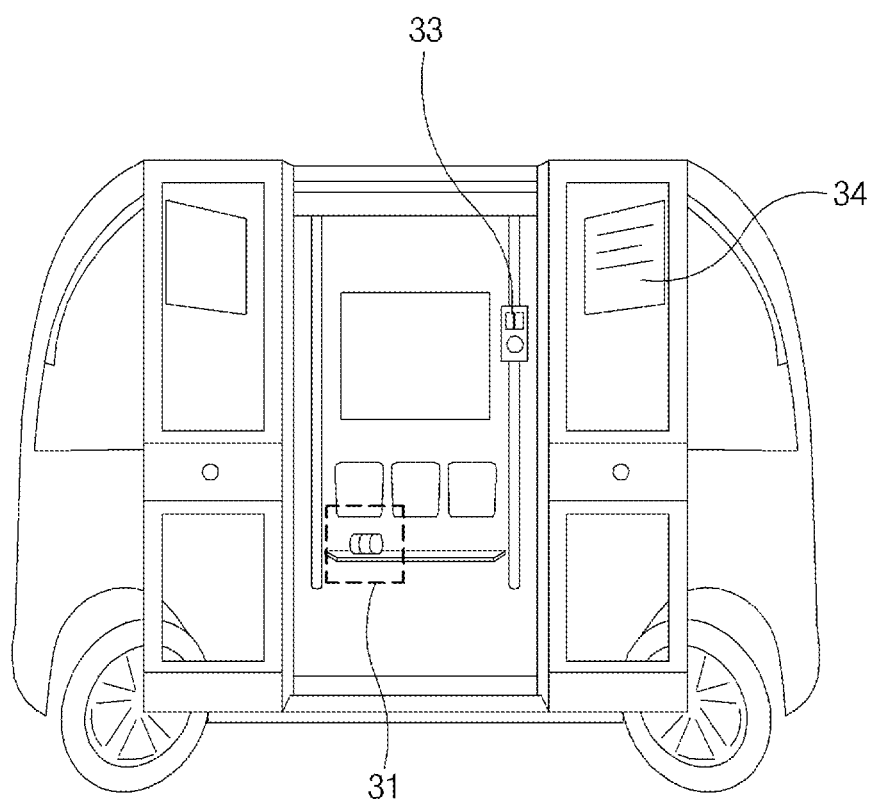
FIG. 4 is a drawing illustrating an autonomous vehicle equipped with a guidance apparatus according to an embodiment of the present disclosure.

Herein, locations of the fire extinguisher lamp 31, the voice output device 33, and the image output device 34 in the autonomous vehicle are shown in FIG. 4.

FIG. 4 is a drawing illustrating an autonomous vehicle equipped with a guidance apparatus is mounted according to an embodiment of the present disclosure.

Next, a second guidance device 40 may be a module for guiding a rescuer outside the autonomous vehicle through rescuer response information, which, as shown in FIG. 5, may include a voice output device 41 and an image output device 42.

FIG. 5 is a block diagram illustrating a detailed configuration of a second guidance device provided in a guidance apparatus for an autonomous vehicle according to an embodiment of the present disclosure.

A voice output device 41 may include a speaker, a piezo sensor, or the like and may output a variety of information necessary to safely extricate a passenger in the autonomous vehicle.

The voice output device 41 may output a manner to pop out the hidden door handle of the autonomous vehicle by force, that is the voice notice "Press the front part of the hidden door handle to pop up the handle." to the outside of the autonomous vehicle.

The voice output device 41 may output precautions when a battery in the autonomous vehicle is disconnected, that is, the voice notice "Note that the orange line among battery connection lines is a high voltage line." to the outside of the autonomous vehicle.

The voice output device 41 may output a voice notice indicating personal information of a passenger in the autonomous vehicle, that is, a gender, an age, a blood type, a health status, or the like of the passenger to the outside of the autonomous vehicle.

The voice output device 41 may output information helping to determine a person who should first be rescued among passengers in the autonomous vehicle, that is, the voice notice "The child is riding on the left/right side of the back seat." to the outside of the autonomous vehicle.

Figure 6:
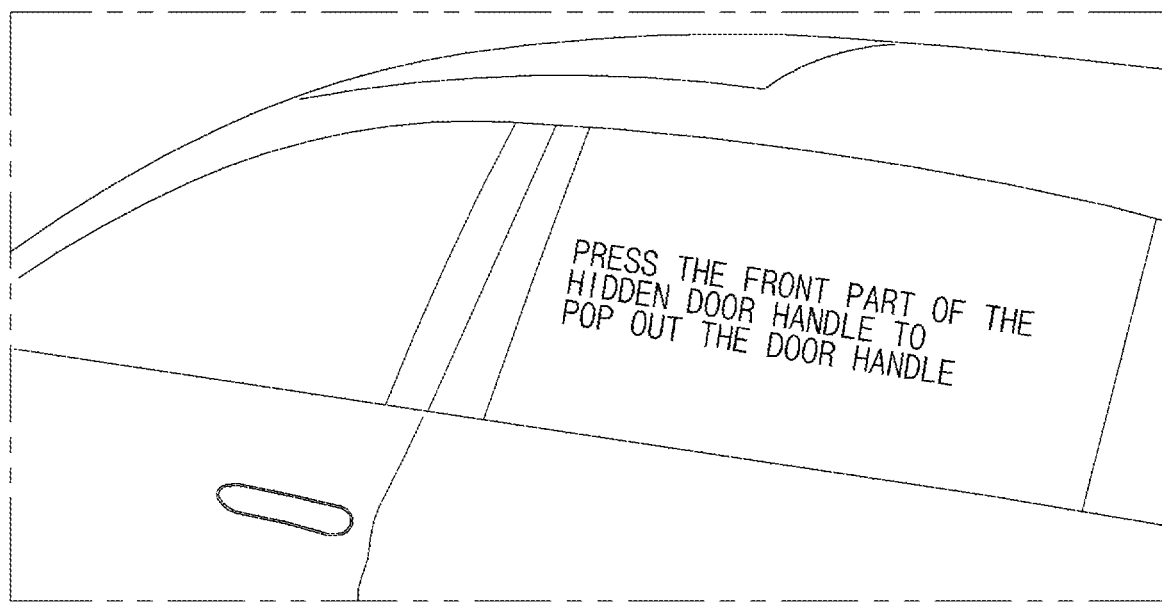
FIG. 6 is a drawing illustrating a glass display of a guidance apparatus for an autonomous vehicle according to an embodiment of the present disclosure.

An image output device 42 may include a glass display or the like as shown in FIG. 6 and may output (display) various images necessary to safely extricate a passenger in the autonomous vehicle.

FIG. 6 is a drawing illustrating a glass display provided in a guidance apparatus for an autonomous vehicle according to an embodiment of the present disclosure.

An image output device 42 of FIG. 5 may output an image for popping out a hidden door handle of the autonomous vehicle by force to the outside of the autonomous vehicle.

The image output device 42 may output an image for notifying a rescuer that the orange line among battery connection lines is a high voltage line to the outside of the autonomous vehicle.

The image output device 42 may an image indicating a gender, an age, a photo, a blood type, a health status, or the like of a passenger in the autonomous vehicle to the outside of the autonomous vehicle.

The image output device 42 may output an image indicating that the child is riding on the left/right side of the back seat of the autonomous vehicle to the outside of the autonomous vehicle.

Next, referring again to FIG. 1, the communication device 50 may include at least one of a mobile communication module, a wireless Internet module, a short-range communication module, or a vehicle-to-vehicle (V2V) module and may transmit a message notifying a surrounding vehicle that a passenger is expected to alight through a right/left/front door of the autonomous vehicle to the surrounding vehicle.

The mobile communication module may transmit and receive data over a mobile communication network constructed according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

The wireless Internet module may be a module for wireless Internet access, which may transmit and receive data through wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication using at least one of Bluetooth™, radio frequency identification (RFID), infrared data association (IrDA), ultra wideband (UWB), ZigBee, near field communication (NFC), or wireless universal serial bus (USB) technologies.

The V2V module may transmit and receive data with a surrounding vehicle. For example, the V2V module may transmit the message "Because an accident occurs in an autonomous vehicle that is stopped, a passenger is expected to get off through the right/left/front door. Be careful driving." to a surrounding vehicle.

Next, the controller 60 may perform overall control such that respective components may normally perform their own functions. Such a controller 60 may be implemented in the form of hardware, may be implemented in the form of software, or may be implemented in the form of a combination thereof. The controller 60 may be implemented as, but not limited to, a microprocessor.

When abnormality occurs in an autonomous vehicle, the controller 60 may perform a variety of control in a process of guiding a passenger and a rescuer through passenger response information and rescuer response information in various manners.

Such a controller 60 may obtain a variety of information over a vehicle network. In this case, the vehicle network may include a controller area network (CAN), a local interconnect network (LIN), FlexRay, media oriented systems transport (MOST), an Ethernet, or the like.

Hereinafter, the operation of the controller 60 will be described in detail.

The controller 60 may determine whether abnormality occurs in the autonomous vehicle. For example, the controller 60 may determine whether the autonomous vehicle collides and whether the autonomous vehicle falls down, based on an amount of change in the value measured by an acceleration sensor 215 of FIG. 2. The controller 60 may determine whether the autonomous vehicle is overturned and whether the autonomous vehicle falls down, based on an amount of change in the value measured by a gyro sensor 214 of FIG. 2. Furthermore, the controller 60 may determine whether the autonomous vehicle collides from behind, based on the value measured by an impact sensor 216 of FIG. 2. In this case, the controller 60 may interwork with an air bag control unit (ACU) provided in the autonomous vehicle to determine whether the autonomous vehicle collides from behind and whether the autonomous vehicle collides. The controller 60 may detect a sharp non-linear movement pattern, such as a sharp increase in axis acceleration of the autonomous vehicle or a sharp change in rotational angle, based on the values measured by the gyro sensor 214 and the acceleration sensor 215. Furthermore, the controller 60 may determine whether there is a fire in the autonomous vehicle based on the result detected by a fire detector 217 of FIG. 2.

When abnormality occurs in the autonomous vehicle, the controller 60 may control guidance on passenger response information and guidance on rescuer response information.

To notify a passenger of a location of a fire extinguisher in the autonomous vehicle as passenger response information, the controller 60 may control at least one of voice guidance on the location of the fire extinguisher in the autonomous vehicle using a voice output device 33 of FIG. 3, image guidance on the location of the fire extinguisher in the autonomous vehicle using an image output device 34 of FIG. 3, or flashing of a fire extinguisher lamp 31 of FIG. 3.

The controller 60 may guide a passenger of the autonomous vehicle through a door (hereinafter referred to as "safe door"), causing the passenger of the autonomous vehicle to alight from the autonomous vehicle without collision with a surrounding vehicle, as passenger response information. In other words, as shown in FIG. 7, the controller 60 may detect surrounding vehicles approaching an autonomous vehicle 700 for each lane using at least one of a LiDAR sensor 211, a camera 212, or a RaDAR sensor 213 of FIG. 2 and may determine a door causing a passenger of the autonomous vehicle 700 to alight from the autonomous vehicle without collision with the surrounding vehicle based on the detected result.

Figure 7:
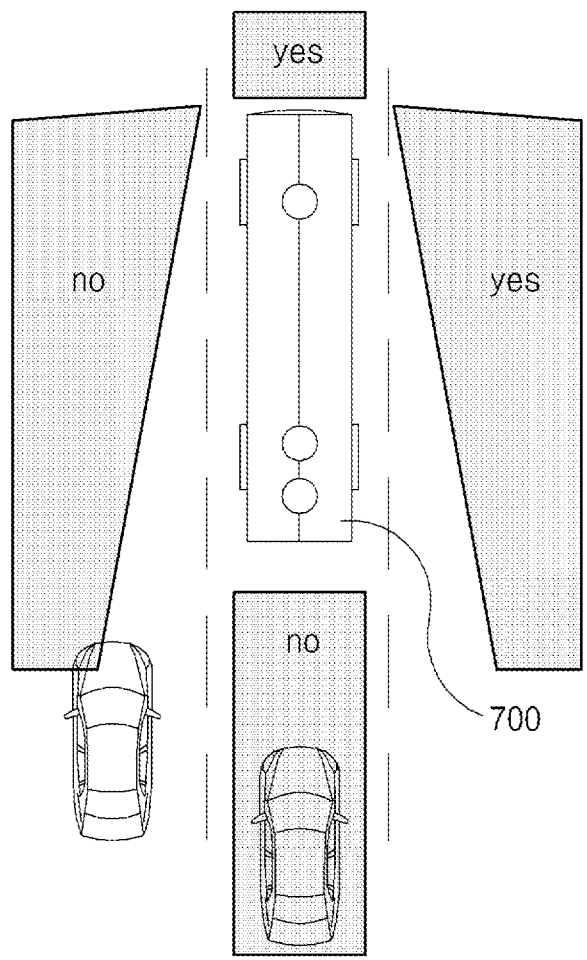
FIG. 7 is a drawing illustrating a process of detecting a safe door in a controller of a guidance apparatus for an autonomous vehicle according to an embodiment of the present disclosure.

FIG. 7 is a drawing illustrating a process of detecting a safe door in a controller provided in a guidance apparatus for an autonomous vehicle according to an embodiment of the present disclosure.

In FIG. 7, a door of an autonomous vehicle 700, corresponding to the "yes" region, is a safe door, and a door of the autonomous vehicle 700, corresponding to the "no" region, is an unsafe door. In other words, a left door of the autonomous vehicle 700 is an unsafe door, and a right door of the autonomous vehicle 700 is a safe door.

A controller 60 of FIG. 1 may control at least one of voice guidance on a safe door using a voice output device 33 of FIG. 3, image guidance on the safe door using an image output device 34 of FIG. 3, or flashing of a door lamp 32 of FIG. 3 corresponding to the safe door.

The controller 60 may control a communication device 50 of FIG. 1 to transmit a message notifying a surrounding vehicle that a door causing a passenger of the autonomous vehicle to alight from the autonomous vehicle without collision with the surrounding vehicle is able to be opened.

The controller 60 may automatically open a door causing the passenger of the autonomous vehicle to alight from the autonomous vehicle without collision with the surrounding vehicle. For example, when the door is not opened within a reference time (e.g., one minute) after guiding the passenger of the autonomous vehicle through the door causing the passenger of the autonomous vehicle to alight from the autonomous vehicle without collision with the surrounding vehicle, the controller 60 may automatically open the door. In this case, the controller 60 may further consider road information (e.g., a highway, a local road, a city street, a school zone, or the like) obtained through a navigation device provided in the autonomous vehicle to determine whether to open the door. For reference, the autonomous vehicle, which is well known and commonly used, has a device (not shown) for automatically opening and closing a door.

The controller 60 may control guidance on a variety of information, necessary to safely extricate the passenger, as rescuer response information.

The controller 60 may control at least one of voice guidance on a method for popping out a hidden door handle by force or image guidance for the method for popping out the hidden door handle by force, such that a rescuer opens the door of the autonomous vehicle. In this case, when the amount of impact applied to the autonomous vehicle is greater than a reference value, the controller 60 may perform the control.

The controller 60 may control at least one of voice guidance on precautions when a rescuer disconnects a battery from the autonomous vehicle or image guidance for the precautions when the rescuer disconnects the battery from the autonomous vehicle. In this case, when the amount of impact applied to the autonomous vehicle is greater than a reference value, the controller 60 may perform the control.

The controller 60 may control at least one of voice guidance on personal information (e.g., a gender, an age, a blood type, a health status, or the like) of a passenger in the autonomous vehicle or image guidance for the personal information (e.g., the gender, the age, a photo, the blood type, the health status, or the like) of the passenger in the autonomous vehicle.

The providing of the personal information of the passenger may be performed when the amount of impact applied to the autonomous vehicle is greater than the reference value, when there is no motion of a passenger in the autonomous vehicle, or when a passenger in the autonomous vehicle is agreed beforehand.

The controller 60 may control at least one of voice guidance on a location of a child in the autonomous vehicle or image guidance for the location of the child in the autonomous vehicle, as information helping a rescuer to determine a person who should first be rescued.

The controller 60 may transmit a control signal for unlocking a door corresponding to a location of a child in the autonomous vehicle to a door lock/unlock system (not shown) in the autonomous vehicle. In this case, the controller 60 may be connected with the door lock/unlock system over a vehicle network. Furthermore, the controller 60 may ascertain a location of a child by means of an indoor camera.

When abnormality occurs in the autonomous vehicle, the controller 60 may control guidance on passenger response information and guidance on rescuer response information, with regard to a state of the passenger in the autonomous vehicle.

The controller 60 may determine whether there is consciousness of a passenger (motion of eyes) by means of the indoor camera. When there is the consciousness of the passenger, the controller 60 may control guidance on passenger response information through a first guidance device 30 of FIG. 3. When there is no consciousness of the passenger, the controller 60 may control guidance on rescuer response information through a second guidance device 40 of FIG. 5. When there is the consciousness of the passenger, but when there is no motion (of the body), the controller 60 may control both the guidance on the passenger response information through the first guidance device 30 and the guidance on the rescuer response information through the second guidance device 40. For reference, the technologies of the determining the consciousness of the passenger is not the gist of the present disclosure, and is fine to use any well-known and commonly-used technology.

Figure 8:
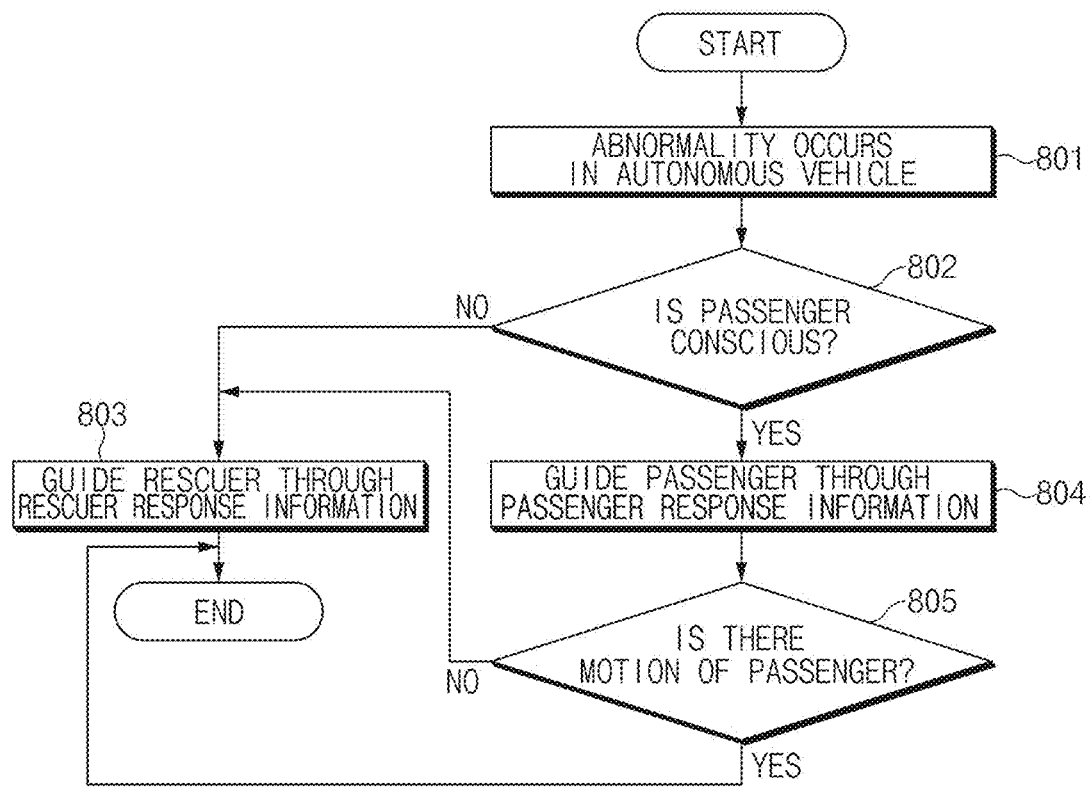
FIG. 8 is a flowchart illustrating a guidance method for an autonomous vehicle according to an embodiment of the present disclosure.

FIG. 8 is a flowchart illustrating a guidance method for an autonomous vehicle according to an embodiment of the present disclosure.

First of all, in operation 801, a controller 60 of FIG. 1 may determine whether abnormality (e.g., collision) occurs in an autonomous vehicle.

In operation 802, the controller 60 may determine whether a passenger in the autonomous vehicle is conscious by means of an indoor camera.

When the passenger is not conscious as a result of the determination in operation 802, in operation 803, the controller 60 may control guidance on rescuer response information.

When the passenger is conscious as a result of the determination in operation 802, in operation 804, the controller 60 may control guidance on passenger response information.

In this case, in operation 805, the controller 60 may further determine whether there is motion of the passenger. When there is no motion of the passenger, the controller 60 may proceed to operation 803. In other words, when the passenger is conscious and when there is no motion, the controller 60 may control both the guidance on the passenger response information and the guidance on the rescuer response information.

Figure 9:
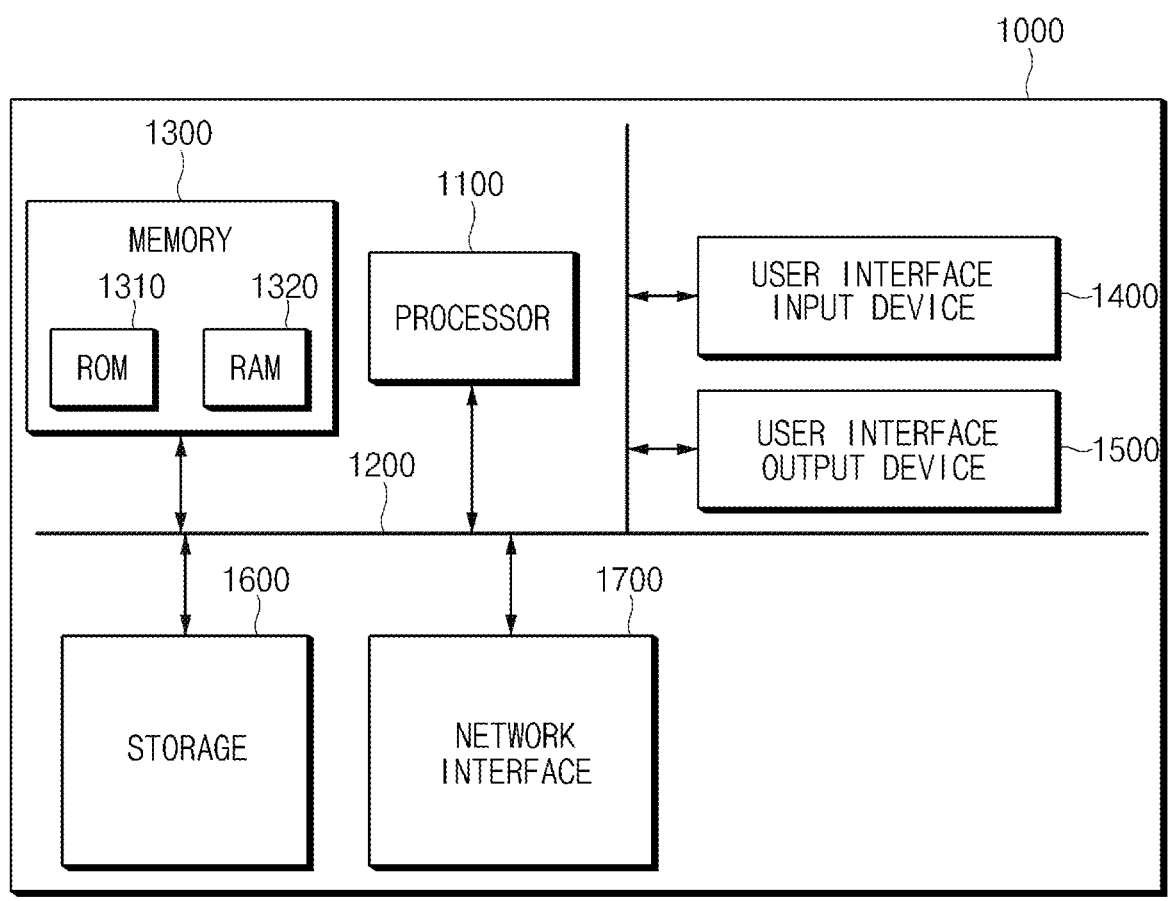
FIG. 9 is a block diagram illustrating a computing system for executing a guidance method for an autonomous vehicle according to an embodiment of the present disclosure.

FIG. 9 is a block diagram illustrating a computing system for executing a guidance method for an autonomous vehicle according to an embodiment of the present disclosure.

Referring to FIG. 9, the guidance method for the autonomous vehicle according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The guidance device for the autonomous vehicle and the method therefor may help a passenger to quickly escape from the autonomous vehicle or may help a rescuer to quickly extricate a passenger from the autonomous vehicle by guiding the passenger and the rescuer through response information for the passenger and response information for the rescuer in various manners when abnormality occurs in the autonomous vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A guidance apparatus for an autonomous vehicle, the guidance apparatus comprising:
    a first guidance device configured to guide a passenger in the autonomous vehicle through first response information;
    a second guidance device configured to guide a rescuer outside the autonomous vehicle through second response information; and
    a controller configured to control guidance on the first response information and guidance on the second response information, when abnormality occurs in the autonomous vehicle,
    wherein the first guidance device includes at least one of a fire extinguisher lamp, a voice output device, or an image output device, and
    the controller controls at least one of voice guidance on a location of a fire extinguisher in the autonomous vehicle, image guidance on the location of the fire extinguisher in the autonomous vehicle, or flashing of the fire extinguisher lamp.

2. The guidance apparatus of claim 1, wherein the first guidance device further includes at least one of a plurality of door lamps.

3. The guidance apparatus of claim 2, wherein the controller guides the passenger of the autonomous vehicle through a door causing the passenger of the autonomous vehicle to alight without collision with a surrounding vehicle.

4. The guidance apparatus of claim 3, wherein the controller controls at least one of voice guidance on the door, image guidance on the door, or flashing of a lamp corresponding to the door.

5. The guidance apparatus of claim 3, wherein the controller notifies the surrounding vehicle of being able to open the door of the autonomous vehicle.

6. The guidance apparatus of claim 3, wherein the controller opens the door, when the door does not open within a reference time after guiding the passenger of the autonomous vehicle through the door.

7. The guidance apparatus of claim 1, wherein the controller determines at least one of a collision, a rear-end collision, drop, overturn, fire, or a non-linear movement pattern of the autonomous vehicle.

8. A guidance apparatus for an autonomous vehicle, the guidance apparatus comprising:
    a first guidance device configured to guide a passenger in the autonomous vehicle through first response information;
    a second guidance device configured to guide a rescuer outside the autonomous vehicle through second response information; and
    a controller configured to control guidance on the first response information and guidance on the second response information, when abnormality occurs in the autonomous vehicle,
    wherein the second guidance device includes at least one of a voice output device or an image output device, and
    the controller controls at least one of voice guidance on a method for popping out a hidden door handle of the autonomous vehicle by force or image guidance on the method for popping out the hidden door handle of the autonomous vehicle by force.

9. The guidance apparatus of claim 8, wherein, when an amount of impact applied to the autonomous vehicle is greater than a reference value, the controller controls at least one of voice guidance on the method for popping out the hidden door handle of the autonomous vehicle by force or image guidance on the method for popping out the hidden door handle of the autonomous vehicle by force.

10. The guidance apparatus of claim 8, wherein the controller controls at least one of voice guidance on precautions when a battery in the autonomous vehicle is disconnected or image guidance on the precautions when the battery in the autonomous vehicle is disconnected.

11. The guidance apparatus of claim 10, wherein, when an amount of impact applied to the autonomous vehicle is greater than a reference value, the controller controls at least one of the voice guidance on the precautions when the battery in the autonomous vehicle is disconnected or the image guidance on the precautions when the battery in the autonomous vehicle is disconnected.

12. The guidance apparatus of claim 8, wherein the controller controls at least one of voice guidance on personal information of the passenger in the autonomous vehicle or image guidance on the personal information of the passenger in the autonomous vehicle.

13. The guidance apparatus of claim 12, wherein, when an amount of impact applied to the autonomous vehicle is greater than a reference value, the controller controls at least one of the voice guidance on the personal information of the passenger in the autonomous vehicle or the image guidance on the personal information of the passenger in the autonomous vehicle.

14. The guidance apparatus of claim 12, wherein, when there is no motion of the passenger in the autonomous vehicle, the controller controls at least one of the voice guidance on the personal information of the passenger in the autonomous vehicle or the image guidance on the personal information of the passenger in the autonomous vehicle.

15. The guidance apparatus of claim 12, wherein, when the passenger in the autonomous vehicle is agreed beforehand, the controller controls at least one of the voice guidance on the personal information of the passenger in the autonomous vehicle or the image guidance on the personal information of the passenger in the autonomous vehicle.

16. The guidance apparatus of claim 8, wherein the controller controls at least one of voice guidance on a location of a child in the autonomous vehicle or image guidance on the location of the child in the autonomous vehicle.

17. The guidance apparatus of claim 16, wherein the controller generates a control signal for unlocking a door corresponding to the location of the child in the autonomous vehicle.

* * * * *